United States Patent [19]

Wood et al.

[11] Patent Number: 5,656,117
[45] Date of Patent: Aug. 12, 1997

[54] METHOD OF LINING PASSAGEWAYS BY APPLYING A PRE-LINER SLEEVE AND HARDENABLE COMPOSITION

[75] Inventors: Eric Wood, deceased, late of Castletown; Miranda J. Bull, administratrix, Peel, both of United Kingdom

[73] Assignee: Insituform (Netherlands) B.V., Netherlands

[21] Appl. No.: 244,972

[22] PCT Filed: Dec. 10, 1992

[86] PCT No.: PCT/GB92/02286

§ 371 Date: Oct. 17, 1994

§ 102(e) Date: Oct. 17, 1994

[87] PCT Pub. No.: WO93/13350

PCT Pub. Date: Jul. 8, 1993

[30] Foreign Application Priority Data

Dec. 20, 1991 [GB] United Kingdom ............... 9127140

[51] Int. Cl.⁶ .................... B29C 63/36; B29C 63/48
[52] U.S. Cl. ............. 156/287; 138/97; 156/294; 264/269; 264/573; 427/236; 427/238
[58] Field of Search ............... 156/156, 287, 156/294, 423; 264/269, 270, 573; 138/97, 98; 118/306, DIG. 10; 427/236, 238, 427

[56] References Cited

U.S. PATENT DOCUMENTS

| | | | |
|---|---|---|---|
| 2,513,289 | 7/1950 | Crom | 264/270 |
| 2,794,758 | 6/1957 | Harper et al. | 156/287 |
| 3,087,515 | 4/1963 | Venable et al. | 264/270 |
| 3,927,164 | 12/1975 | Shimabukuro | 156/287 |
| 3,960,644 | 6/1976 | McFadden | 156/423 |
| 4,064,211 | 12/1977 | Wood | 156/287 |
| 4,077,610 | 3/1978 | Masuda | 254/134.4 |
| 4,401,696 | 8/1983 | Wood | 427/236 |
| 4,764,237 | 8/1988 | Shishkin et al. | 264/269 |
| 4,810,453 | 3/1989 | Clarke et al. | 264/269 |
| 4,865,673 | 9/1989 | Shishkin et al. | 156/294 |
| 5,409,561 | 4/1995 | Wood | 156/287 |

FOREIGN PATENT DOCUMENTS

| | | | |
|---|---|---|---|
| 226036 | 6/1987 | European Pat. Off. | |
| 126422 | 9/1980 | Japan | 156/294 |
| 1352829 | 5/1974 | United Kingdom | 156/294 |
| WO92/08921 | 5/1992 | WIPO | |

*Primary Examiner*—Steven D. Maki
*Attorney, Agent, or Firm*—Cowan, Liebowitz & Latman, P.C.; Michael I. Wolfson

[57] ABSTRACT

A method of lining passageways, or pipelines, employs a pre-liner sleeve formed of a thin plastic material, which is applied to the inside surface of the passageway to be lined. During application of the pre-liner sleeve, it is held in a concertina-like folded condition in a magazine which is moved along the passageway by operation of air pressure which is applied from within the pre-liner sleeve, and which simultaneously inflates the pre-liner sleeve so that it communicates with the inside surface of the passageway. A spray head follows the magazine from within the inflated pre-liner sleeve and applies a hardenable composition, such as mortar, to the inside of the inflated pre-liner sleeve. The spray head is followed, in some embodiments, by a tube which is everted to communicate with the applied hardenable composition under air pressure. The tube holds the applied layer in position while it cures.

10 Claims, 2 Drawing Sheets

1

METHOD OF LINING PASSAGEWAYS BY APPLYING A PRE-LINER SLEEVE AND HARDENABLE COMPOSITION

FIELD OF THE INVENTION

This invention relates to the lining of pipelines and passageways, especially the lining of underground pipelines and passageways for the rehabilitation, improvement, repair or change of use or coating of such pipelines or passageways.

DESCRIPTION OF THE PRIOR ART

There are now established a number of techniques for the lining of pipelines and passageways, and these techniques are to a greater or lesser extent successful, and the techniques tend to lend themselves to particular application. That is to say, some techniques are better for some circumstances, whilst other techniques are better for other circumstances.

For example, there are known cement mortar lining techniques wherein cement mortar is applied directly to the passageway or pipeline surface by spraying, trowelling or by other methods, and such cement mortar lining may be provided with a reinforcement means such as metallic rods, bars or the like. Cement mortar lining techniques are particularly suitable for large pipelines and passageways where man entry is easy, but as the pipeline or passageway reduces in size until man entry is not possible, cement mortar lining is not as appropriate as other techniques, although it is still possible to effect such a lining method by pulling a spraying device through the pipeline or passageway and by spraying the cement mortar material onto the pipeline or passageway surface. Adopting similar methods, it is possible to apply other lining materials to passageway surfaces, such as curable synthetic resinous materials which like cement mortar harden to provide a rigid lining on the pipeline or passageway surface. Such synthetic resinous materials, which are of course curable, may or may not be provided with reinforcement as required. Such reinforcement may comprise fibrous materials such as glass fibre or scrim or felt materials.

Other techniques which are used for pipeline or passageway lining comprise the fabrication of a flexible lining tube which embodies an absorbent layer or layers, and such layer or layers is or are impregnated thoroughly with a curable synthetic resin at ground level, and then the impregnated bag is fed into the pipeline or passageway before the resin cures, and is held to the surface thereof by fluid pressure until the resin cures forming a rigid lining pipe inside the existing pipeline or passgeway. These techniques are particularly suitable for the lining of pipelines or passageways which are of the smaller non man entry size, although they can be used for man entry pipelines and passageways if required.

U.S. Pat. No. 4,077,610 for example describes a method and apparatus for everting a tube through the interior of a pipe with a view to providing a means for passing an article such as a wire or fibroscope through the interior of the pipe. In one embodiment of U.S. Pat. No. 4,077,610 the tubing is folded in a way similar to a paper lantern and the folded section advances and progressively everts along the passageway behind a fibroscope due to pressure from an external source.

Other techniques involve the feeding directly into the pipeline or passageway of semi-rigid plastic pipes of smaller size than the pipeline or passageway, followed by the filling of the space between the pipeline or passageway and the rigid pipe with a grouting material.

The present invention is concerned with a pipeline or passageway lining method wherein a fluent composition such as cement mortar or a curable resin or the like is sprayed or in suitable circumstances otherwise applied to the pipeline or passageways surface so as to form in effect a pipe of such material (when it has cured or hardened) lying inside the existing pipeline or passageway to form a lining for same.

One of the difficulties which arises in connection with the techniques referred to above wherein a fluent composition is applied to the pipeline or passageway surface is that the composition will tend to anchor to the pipeline or passageway surface on the one hand, and on the other hand, where the pipeline or passageway surface has crevices or recesses, the fluent material will tend to flow into such crevices or recesses and at these locations, there will not be an even layer of the cured material because at such locations, the cured material would tend to follow the contour of the crevice or recess. At such location there will inevitably be a potential weakness point in the lining at best, or cracks or holes in the lining at worst.

In accordance with the invention set forth in our co-pending application no. 9024274.4 a method of lining a pipeline or passageway comprises placing in said pipeline or passageway a "pre-liner" sleeve of a construction so that the sleeve can be inflated, followed by inflation of the sleeve on to the pipeline or passageway surface, followed by the spraying onto the inner surface of the inflated pre-liner sleeve of the fluent composition to form a layer of such composition on the inner surface of the inflated pre-liner sleeve which subsequently cures or is cured to form a rigid pipe of said composition on the pipeline or passageway surface, the said pre-liner sleeve, being inflated by means of a gaseous medium enabling a spraying device to be displaced along the inflated pre-liner sleeve, for the application of said fluent composition to said surface.

In the instant invention, the pre liner sleeve is folded and stored in a magazine, which is propelled along the inside of the pipeline or passageway, the sleeve being drawn out and inflated as the magazine so moves. A spray head preferably is attached to the magazine so as to move with same, and in some embodiments of the invention an air pump is connected to the magazine for inflating the liner, for delivering the fluent composition to the spray head, and optionally for propelling the magazine or for assisting such propulsion.

The sleeve is preferably folded concertina fashion in the magazine, which is a cup shaped member housing the sleeve on the inner curved surface. Preferably the end surface of the magazine serves as a means through which the supply of compressed air passes.

According to another preferred feature, an inflation tube may be everted into the lining tube from the end opposite to that to which the magazine is being moved, after the application of the fluent composition, and before the fluent composition has cured. The lining tube may have on the side which is everted onto the composition, an absorbent layer, such as a needled felt or the like which soaks up the composition and becomes embedded therein. The said absorbent material may or may not be impregnated with a curable synthetic resin as required.

The fluent composition may be supplied with a mixture of dry cementitious powder, and water, these ingredients being supplied from different sources, and mixing in the vicinity of the spraying apparatus or indeed on the inner surface of the inflated pre-liner tube.

Preferably however, the fluent composition will be a cement mortar material (polymeric concrete) or more preferably a synthetic resinous composition which is curable and which preferably contains reinforcement fibres in the form of glass fibres.

The spraying device may be of any suitable form, and preferably is adapted to apply an even layer of the composition on the inner surface of the pre-liner tube, of sufficient thickness so that the composition when it cures will form a rigid pipe which is free standing inside the pipeline or passageway.

The fluent composition will preferably be of a viscosity so that it will remain as a coherent and preferably even thickness layer on the inflated pre-liner inner surface, but otherwise, the said holding tube may be everted into the pipeline or passageway.

The invention provides a number of advantages including that the pre-liner sleeve prevents the loss of the composition into cracks fissures and recesses in the pipeline or passageway surface, as the pre-liner sleeve will bridge these imperfections.

Secondly, the pre-liner sleeve will form a slip plane between the pipeline or passageway surface and the surface of the rigid pipe formed by the cured composition so that if there is any ground movement giving rise to relative movements of different sections of the pipeline or passageway surface, such relative movements will either not be transferred to the rigid composition pipe or will not be transmitted to this pipe to the same extent so that it will not be as liable to fracture in such circumstances as would be a composition pipe created by direct application of the fluent composition to the pipeline or passageway surface. The formation of cracks in conventionally applied cured composition pipes represents a major disadvantage of cement mortar and the like lining techniques and therefore the present invention represents a considerable advance in the art.

The passageway to be lined may be of any shape, circular, egg shaped, or otherwise.

BRIEF DESCRIPTION OF THE DRAWING

An embodiment of the present invention will now be described, by way of example, with reference to the accompanying diagrammatic drawings, wherein.

DETAILED DESCRIPTION

Figure 1:
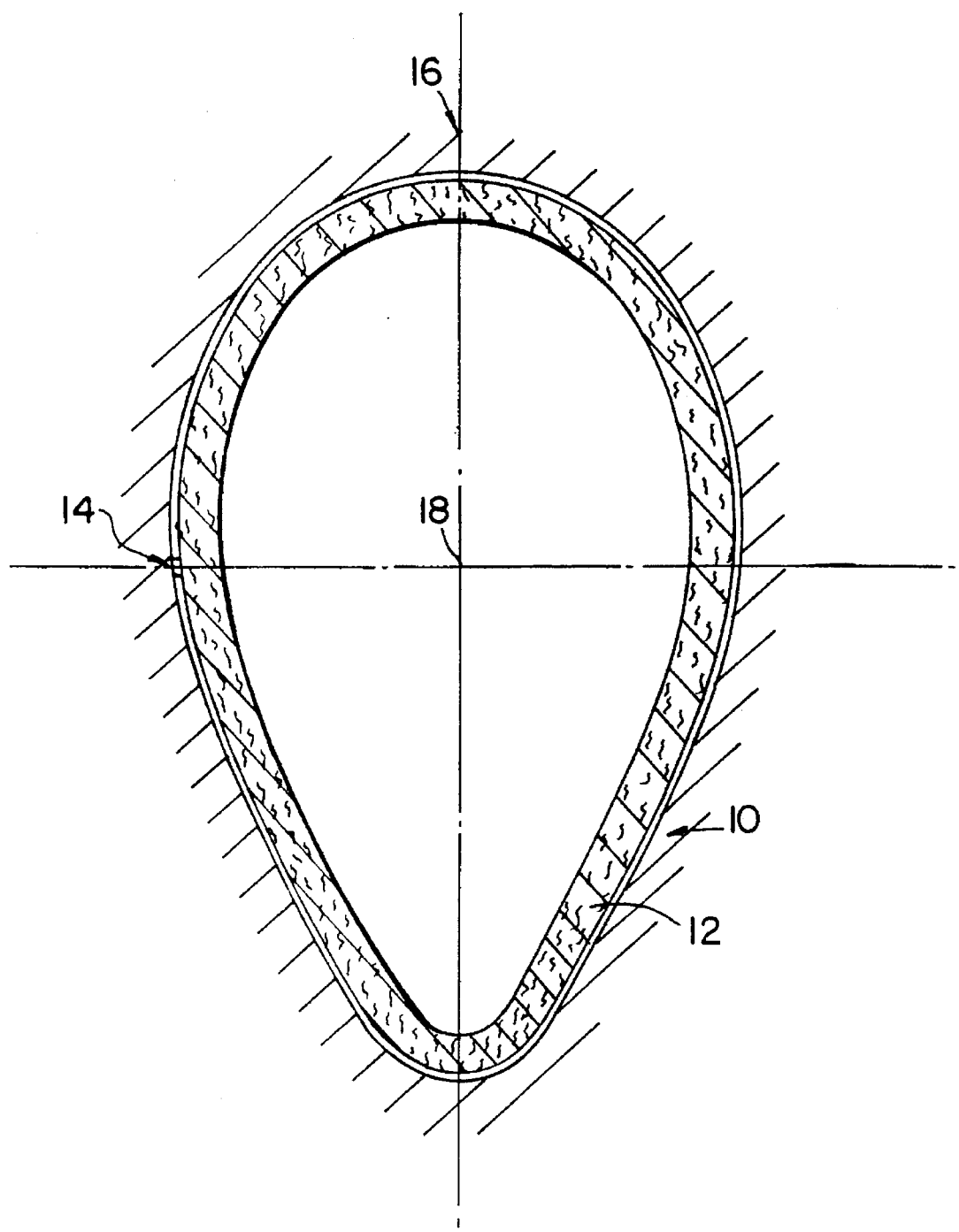
FIG. 1 is sectional elevation of an egg shaped sewer lined according to the embodiment of the invention.

Referring to the drawings, an egg shaped sewer (10) of dimensions 1200 mm by 900 mm approximately requires to be lined for its rehabilitation or repair. The lining which is applied in accordance with the present invention is in fact shown in FIG. 1 by reference numeral (12), and the lining thickness will in fact vary from a horizontal medial region (14), where it is thickest to the vertical medial region (16) where it is thinnest. The ratio of the thickest portion of the layer to the thinnest portion may be in the order of 1.6 to 1. This variation in thickness arises because the material of the lining is in fact sprayed onto the surface of the egg shaped sewer from a central axis which may lie for example at position (18). The side walls are closer to the axis (18) than the top and bottom of the sewer and therefore will receive more fluent material.

Figure 2:
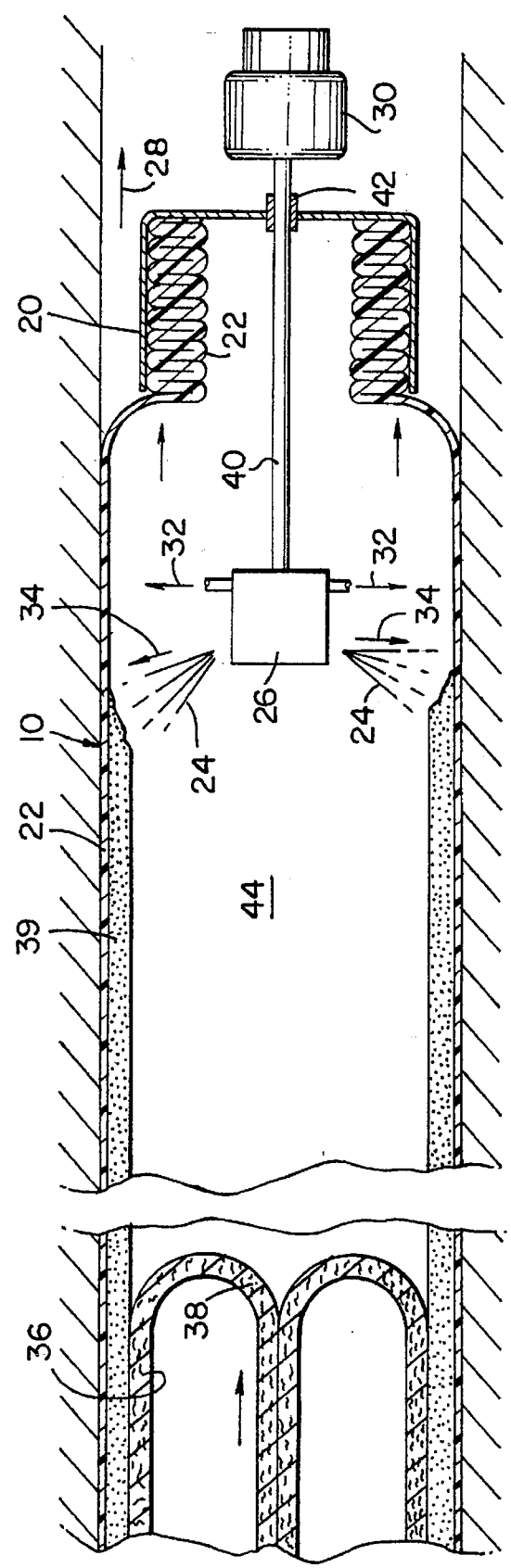
FIG. 2 is a sectional elevation illustrating a section of the sewer shown in FIG. 1, for the purposes of explaining the method of the embodiment of the invention.

FIG. 2 shows the arrangement according to the embodiment of the invention, and it will be seen that in the sewer (10) is a magazine (20) which holds concertina fashion a polymeric material pre-lining sleeve (22) which forms a pre liner which is applied to the surface of the sewer (10) prior to the spraying of the fluent composition (24) from the head (26). The sleeve (22) is pulled from the magazine as the magazine is moved along the sewer in a direction of arrow (28), and a pump unit (30) connected to the magazine (20) serves to blow pressurising air as indicated by arrows (32) into the interior of the emerging lining sleeve (22) so as to press same against the surface of the sewer (10).

The compressed air from the pump unit (30) also supplies the fluent composition to the spray head (26) and rotates the head to cause the fluent composition to be thrown onto the pre liner sleeve as indicated by the arrows (34).

When the fluent, hardenable composition is a mortar cement and water, the mortar cement and water are sprayed by spray head (26). In these cases, water and mortar are supplied to and mixed in spray head (26).

As an option, a holding tube (36) may be everted into the sewer by any of the well known eversion techniques soon after the application of the fluent composition (12/24) is applied, and before it cures so that an inner fibrous surface (38) of the tube (36) is applied to the composition and becomes embedded therein. The tube (36) will be relatively thin compared to the layer (39) of composition (24), as its purpose mainly is to hold the layer (12) in position whilst it cures.

The holding tube (36) however remains in position with the lining (12) after curing and will form an inner skin to the lining.

The folded sleeve (22) is folded concertinal fashion and forms an annulus on the inner wall of the magazine (20) which is cup-shaped. The pipe (40) carrying the fluent composition and compressed air passes through a bearing seal (42) in the end wall in the magazine (20). As the region (44) inside the pre-liner sleeve (22) is pressurized, the back pressure on the magazine (20) will cause or assist movement of the magazine in the direction of arrow (28) whereby the folded sleeve (22) will progressively unfold and feed from the magazine (20) and be inflated progressively onto the surface of pipeline or passageway (10). It has been found that long lengths of pipeline can be prelined in this way without having to join several sleeves (22) together.

It is claimed:

1. A method of lining a pipeline or passageway with a pre-liner sleeve and a hardenable composition, the pipeline or passageway having a proximal end and a distal end with an interior surface, the interior of the pipeline or passageway being accessible, comprising:

placing a magazine including the pre-liner sleeve stored therein in a folded condition into the interior of the pipeline or passageway, providing a pressure-and-spray means both for applying an internal radial pressure to the sleeve as the sleeve unfolds and for spraying a composition against the sleeve wherein the pressure-and-spray means is coupled to the magazine;

moving the magazine and sleeve stored therein from the proximal end of the pipeline or passageway towards the distal end thereof;

allowing the sleeve to be drawn out from the magazine and unfolded as the magazine is moved in the pipeline or passageway;

applying an inflation pressure from the pressure-and-spray means to force the sleeve being drawn out against the interior surface of the pipeline or passageway as the magazine is moved;

applying a fluent, hardenable composition from the pressure-and-spray means to the interior of the sleeve as the sleeve is held against the interior surface of the pipeline or passageway; and allowing the hardenable composition to harden.

2. The method of claim 1, wherein said fluent, hardenable composition comprises mortar cement and water and said pressure-and-spray means comprises a spray head, said composition being sprayed by the spray head, further including the steps of:

supplying water to said spray head;

supplying mortar cement to said spray head; and mixing said water and mortar cement in said spray head.

3. The method of claim 2, wherein the pressure-and-spray means includes an air pump and further including:

blowing air from the air pump wherein the air from the air pump applies the inflation pressure and rotates the spray head.

4. The method of claim 1, wherein the pressure-and-spray means includes a spray head and a pipe and the magazine includes a bearing seal, and the pipe passes through the bearing seal.

5. The method of claim 1, including the step of everting a holding tube onto the applied fluent, hardenable composition prior to the composition becoming cured, for holding the fluent, hardenable composition in position on the interior surface of the inflated pre-liner sleeve.

6. The method of claim 1, wherein the sleeve is folded in the magazine in a concertina fashion to form an annular pack.

7. The method of claim 6, wherein the magazine has a substantially cylindrical cup-shape and the annular pack is installed therein whereby the annular pack conforms to the substantially cylindrical cup-shape.

8. The method of claim 1, wherein said step of moving the magazine and sleeve stored therein and said step of applying an inflation pressure are performed simultaneously.

9. The method of claim 1, wherein said step of applying an inflation pressure includes introducing compressed air into the interior of the pre-liner sleeve by said pressure-and-spray means.

10. The method of claim 1, wherein the magazine is moved towards the distal end of said pipeline or passageway as a result of the inflation pressure produced during performance of said step of applying an inflation pressure to the interior of the pre-liner sleeve.

* * * * *